3,518,236
ACCELERATION OF SULFUR-VULCANIZATION OF RUBBER WITH SULFINIC ACIDS AND DERIVATIVES
Byron A. Hunter, Woodbridge, Conn., assignor to Uniroyal, Inc., New York, N.Y., a corporation of New Jersey
No Drawing. Filed July 20, 1967, Ser. No. 654,705
Int. Cl. C08c *11/54;* C08f *27/06;* C07d *87/22*
U.S. Cl. 260—79.5                                   15 Claims

ABSTRACT OF THE DISCLOSURE

Scorch safety or delayed action acceleration is achieved by using, as accelerators, organic sulfinic acids, metal or amine salts of sulfinic acids, aldehyde reaction products of sulfinic acids (hydroxy sulfones), or aldehyde-amine reaction products of sulfinic acids. Examples are p-toluene sulfinic acid, zinc benzene sulfinate, n-butylammonium-p-toluene sulfinate, reaction product of p-toluene sulfinic acid and formaldehyde, reaction product of p-toluene sulfinic acid and ethanolamine.

---

This invention is concerned with acceleration of the sulfur-vulcanization of rubber. More particularly, the invention resides in the discovery that organic sulfinic acids, salts of organic sulfinic acids, aldehyde reaction products of sulfinic acids, and aldehyde and amine reaction products of sulfinic acids, constitute a highly useful class of rubber vulcanization accelerators.

The application of certain organic sulfur compounds as rubber vulcanization accelerators is well known and widely practiced in the rubber industry. Mercaptobenzothiazole and certain derivatives of mercaptobenzothiazole are highly regarded as vulcanization accelerators and have been employed as such for many years. Derivatives of dithiocarbamic acid have also been used in great quantity but these materials are generally classed as ultra accelerators, being fast in their action and often functioning at relatively low curing temperatures. For many applications in the rubber industry the rapid curing action at low or moderate temperatures is desirable. For other applications, however, the curing action at moderate temperatures is disadvantageous, particularly in cases where the rubber composition is subjected to processing temperatures prior to the curing cycle which activate the accelerator and cause undesirable "precure" or "scorch." Rubber stock which is "scorched" during mixing or shaping procedures is difficult to mix or process and often produces cured rubber vulcanizates of inferior quality. For these and other reasons "delayed action" or "safe" accelerators have been sought which are relatively inactive at somewhat elevated processing temperatures but become active vulcanization accelerators at higher curing temperatures. The so-called benzothiazole sulfenamides show decided advantages over previously used accelerators as far as scorch safety is concerned and this class of delayed action accelerators now enjoys the wide usage in the rubber industry. However, with continuing trends toward faster and higher temperature processing operations the need for accelerators possessing scorch safety beyond that afforded by the benzothiazole sulfenamides is now clearly recognized.

It is an object of the present invention to provide a new class of rubber vulcanization accelerators which exhibit a high degree of scorch safety under relatively high temperature mixing and processing operations but which are effective vulcanization accelerators at higher curing temperatures. It is also an object of the invention to provide rubber vulcanization accelerators which show a higher degree of scorch safety than does N-cyclohexyl benzothiazole sulfenamide and which function as effective vulcanization accelerators at curing temperatures in excess of 300° F. It is a further object to provide rubber vulcanization accelerators which can be readily prepared in high yield at low cost from easily available and low cost intermediates. Another objective is to provide a class of rubber vulcanization accelerators which exhibit a broad spectrum of scorch safety and accelerator activity and from which selected chemical compounds can be chosen for use in specific applications.

I have discovered that organic sulfinic acids and salts of organic sulfinic acids as well as certain derivatives of sulfinic acids are valuable vulcanization accelerators. Thus, I have found that free sulfinic acids and their metal salts exhibit unusual resistance to prevulcanization under normal processing temperatures but function very effectively as vulcanization accelerators at higher curing temperatures. I have also found the scorch and curing properties of organic sulfinic acids can be further modified by producing salts with ammonium or various substituted ammonium radicals as salt forming substituents, or by producing formaldehyde or formaldehyde-amine (or ammonia) derivatives of the sulfinic acids.

The organic sulfinic acids employed in the invention are chemical compounds characterized by the structure:

$$R-\overset{O}{\underset{\|}{S}}-OH$$

where R is an organic radical. These substances can be produced in a number of ways. The salts of the sulfinic acids are usually more stable than the free acids and are particularly preferred as vulcanization accelerators. A simple procedure for producing an alkali metal salt of a sulfinic acid useful in the invention involves the reaction of an organic sulfonyl chloride with sodium sulfite in the presence of aqueous alkali:

$RSO_2Cl + Na_2SO_3 + 2NaOH \rightarrow$
$$RSO_2Na + NaCl + Na_2SO_4 + H_2O$$

Treatment of the salt with mineral acid produces the free sulfinic acid (often less stable than the salt):

$$RSO_2Na + HCl \rightarrow RSO_2H + NaCl$$

Prepartion of the zinc salt of benzene sulfinic acid is illustrated in the following representation:

(1) 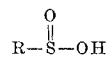
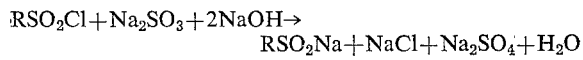

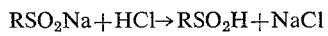

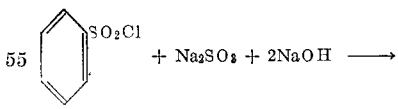

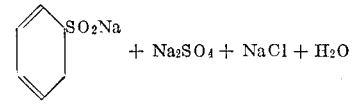

(2) 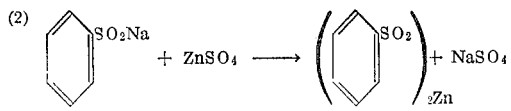

Sulfinic acids for use in the invention can also be prepared by reacting aromatic hydrocarbons with sulfur dioxide in the presence of aluminum chloride or by reacting a diazotized aromatic amine with sulfur dioxide in the presence of a copper catalyst.

p-Toluene sulfinic acid can be prepared by reacting p-toluene sulfonyl chloride with sodium sulfite in aqueous caustic, followed by acidification of the resulting solution of sodium p-toluene sulfinate. Treatment of the free acid in an organic solvent (as alcohol) with an amine produces an amine salt of p-toluene sulfinic acid useful in the invention:

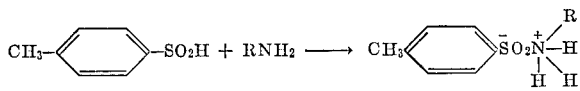

To make chemicals useful in the invention, primary, secondary and tertiary amines can be used, among which may be mentioned:

| | |
|---|---|
| methylamine | morpholine |
| ethylamine | piperidine |
| n-propylamine | dimethylamine |
| iso-propylamine | ethanolamine |
| n-butylamine | cyanoethylamine |
| secondary butylamine | diethylamine |
| tertiary butylamine | dipropylamines |
| tertiary octylamine | dibutylamine |
| triethylamine | laurylamine |
| tributylamine | cyclohexylamine |
| amylamine | dicyclohexylamine |
| hexylamine | benzylamine |
| octylamine | trimethylamine |
| dodecylamine | ethylenediamine |
| octadecylamine | dimethylamino propylamine |

Sulfinic acids also react with formaldehyde and other aldehydes:

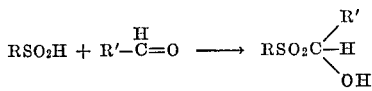

where R' is H or an organic radical. The latter alphahydroxy sulfone compounds may be utilized as accelerators according to the invention or they may be further reacted with ammonia or primary amines to form compounds which are useful in the practice of my invention:

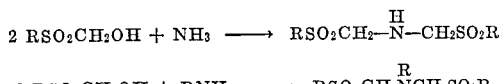

From the foregoing it will be apparent that the sulfinic acid compounds which are useful as vulcanization accelerators in the practice of my invention cover a wide range of materials, including three general types, as follows:

Type (A): free sulfinic acids and metal salts of sulfinic acids;

Type (B): amine (or ammonium) salts of sulfinic acids; and

Type (C): formaldehyde reaction products of sulfinic acids (i.e., alpha-hydroxy sulfones) and formaldehyde-primary amine (or ammonia) reaction products of sulfinic acids.

The foregoing three general types may be represented by four general formulas, as follows:

Types A and B:

I.

II.
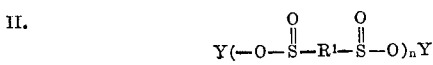

Type C:

III.
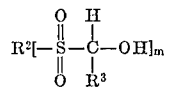

IV.
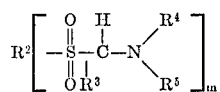

In Formula I, above, R is a monovalent organic radical selected from aryl (e.g., phenyl, biphenyl, naphthyl), alkyl (e.g., methyl, butyl, octyl, etc.), cycloalkyl (e.g., cyclohexyl), in which categories I include equivalent combinations thereof and equivalent substituted forms thereof (e.g., aralkyl [such as benzyl], alkaryl [such as tolyl], halo [e.g., chloro, bromo]-substituted as in chlorophenyl, nitro-substituted as in nitrophenyl, acetamino or acetamido-substituted as in acetamidophenyl, as well as heterocyclic radicals such as 2-benzothiazyl), for example, while $n$ is a number equal to the valence of Y, and Y is selected from (a) hydrogen
(b) metal (including univalent and polyvalent metals such as sodium, potassium, lithium, calcium, magnesium, aluminum, barium, zinc, copper, nickel, cadmium, cobalt, tin, lead, iron, etc.)
(c) the radical:

where $R^6$, $R^7$ and $R^8$ are the same or different and are selected from hydrogen, alkyl (e.g., methyl, propyl, octyl, etc.), cycloalkyl (e.g., cyclohexyl), with or without various substituents such as CN, OH, $NH_2$, etc., and may be combined in a cyclic structure such as piperidyl or morpholyl.

In Formula II, above, $R^1$ is a divalent organic radical such as alkylene (e.g., methylene, polymethylene, ethylidene, etc.) or arylene (e.g., phenylene, biphenylene, naphthylene), and $n$ and Y are as previously defined.

In Formula III, $R^2$ is a monovalent organic radical as previously defined for R, or a divalent organic radical as previously defined for $R^1$, or a higher-valent organic radical; $m$ is a number equal to the valence of $R^2$; and $R^3$ is hydrogen, alkyl (e.g., methyl, propyl, octyl, etc.) or aryl (e.g., phenyl, biphenyl, naphthyl).

In Formula IV, $R^2$, $R^3$ and $m$ are as previously defined for Formula III, and $R^4$ and $R^5$ are the same or different and may have values as defined for $R^6$, $R^7$ and $R^8$ as set forth above.

The following are examples of sulfinic acid compounds which are useful for the purposes of my invention: p-toluene sulfinic acid, 2,4,5-trichlorobenzene sulfinic acid, zinc benzene sulfinate, calcium benzene sulfinate, barium benzene sulfinate, magnesium benzene sulfinate, lead benzene sulfinate zinc, p-toluene sulfinate, calcium p-toluene sulfinate, barium p-toluene sulfinate, magnesium p-toluene sulfinate, sodium p-toluene sulfinate, t-octylammonium p-toluene sulfinate, n-dodecylammonium p-toluene sulfinate, cyclohexylammonium p-toluene sulfinate, dibutylammonium p-toluene sulfinate, triethylammonium p-toluene sulfinate, t-butylammonium p-toluene sulfinate, n-butylammonium p-toluene sulfinate, dimethylammonium p-toluene sulfinate, zinc salts of mixed toluene sulfinic acids, zinc 2,5-dimethylbenzene sulfinate, cyclohexylammonium-2,5-dimethyl benzene sulfinate, zinc 2-naphthalene sulfinate, cyclohexylammonium-2-naphthalene sulfinate, dicyclohexylammonium p-toluene sulfinate, methylammonium p-toluene sulfinate, zinc salt of meta benzene disulfinic acid, diethylammonium p-toluene sulfinate, cadmium benzene sulfinate, stannous benzene sulfinate, nickelous benzene sulfinate, cupric p-toluene sulfinate, nickelous p-toluene sulfinate, zinc 2,4,5-trichloro benzene sulfinate, zinc p,p'-oxybis(benzene sulfinate), zinc p-chloro benzene sulfinate, zinc butane-1,4-disulfinate, zinc p-nitrobenzene sulfinate, p-tolyl hydroxymethyl sulfone, p-acetamino benzene sulfinic acid, zinc p-acetamino benzene sulfinate, zinc a-toluene sulfinate, reaction product of p-toluene sulfinic acid and ethanolamine, reaction product of p-toluene sulfinic acid and ethylene diamine (2:1), and reaction product of p-toluene sulfinic acid and 3-dimethylamino propylamine.

The foregoing examples are given as illustrative of the sulfinic acid compounds which are useful as accelerators. It is not intended that the invention be limited to the specific products listed inasmuch as it will be realized that many other sulfinic acids and sulfinic acid salts may also be employed.

Preferred chemicals are those of Type A as defined above, namely, the free sulfinic acids and their metal salts. These exhibit exceptional scorch safety (based on the 270° F. cure data) and are particularly well suited for relatively high temperatures (circa 350° F.; frequently 300–400° F. or more) cure. In other words these are high temperature accelerators. In the Type A chemicals which are free acids, R is preferably p-toluene or 2,4,5-trichlorobenzene. p-Toluene sulfinic acid appears to be considerably more stable than benzene sulfinic acid and is therefore a preferred product. In the type A chemicals which are metal salts of sulfinic acids, R may have a wide variety of values without restriction, as illustrated.

The materials of Type B, above, ammonium or substituted ammonium salts, on the other hand, have scorch characteristics approaching conventional accelerators (such as N-cyclohexyl benzothiazole sulfenamide, for example), although some of these show a definite advantage as far as scorch rate (at 270° F.) is concerned.

Materials under Type C, above, the formaldehyde- or formaldehyde-ammonium (or amine) derivatives generally fall between Types A and B as far as scorch safety and accelerating characteristics are concerned. In Types B and C, the R's may have a wide variety of values without restriction, as described.

The sulfinic acid compounds of my invention can be used as accelerators of vulcanization of various elastomeric materials as typified by the conjugated diolefin homopolymers and copolymers of conjugated diolefins with copolymerizable monoethylenically unsaturated monomers, including such homopolymers as polyisoprene (natural or synthetic, high cis-content or otherwise), polybutadiene (emulsion or solution-prepared, high cis-content or otherwise), and copolymers like butadiene-styrene copolymer (emulsion or solution-prepared, stereo-specific or otherwise), butadiene-acrylonitrile copolymer, butadiene-vinylpyridine copolymer, the unsaturated, sulfur-vulcanizable olefin copolymer rubbers, such as terpolymers of ethylene and propylene with such dienes as dicyclopentadiene, 1,4-hexadiene, cyclooctadiene, methylene norbornene, ethylidene norbornene, and similar non-conjugated dienes, and the "butyl" rubber types, that is, rubbery copolymers of isoolefins such as isobutylene with dienes such as isoprene. These may be described in general as unsaturated, sulfur-vulcanizable diene polymer rubbers. For purposes of the invention the present accelerator is compounded with the dienic unsaturated sulfur-vulcanizable rubber, sulfur, and any desired conventional compounding ingredients usually used in sulfur vulcanizates, all in conventional proportions. Mixing and shaping of the vulcanizable composition may be accomplished in the conventional manner, and the vulcanization may be accomplished by heating under appropriate conditions usually used for sulfur vulcanization of rubber, the time and temperature of heatning being in general inversely related as in conventional practice. Materials of Type A, above, are particularly advantageous for curing at what are regarded as highly elevated conventional curing temperatures (e.g., 350–450° F.).

The sulfinic acid compounds may be used as sole accelerators or may be used in combination with other known accelerators or vulcanization activators known to those skilled in the art.

In order to illustrate the valuable characteristics of sulfinic acid components as vulcanization accelerators the following examples (all quantities being expressed as parts by weight) are shown:

EXAMPLE I

A synthetic rubber composition was prepared, combining the following ingredients in a Banbury mixer, using #2 speed and with cooilng water turned on:

| | |
|---|---|
| Oil extended (37.5% oil) butadiene-styrene (23% styrene) copolymer | 137.5 |
| Zinc oxide (Protox 166) | 3.0 |
| p-Isopropylamino diphenylamine (Flexzone 3C) | 1.5 |
| High abrasion furnace carbon black (Vulcan 3) | 68.0 |
| Wax blend (Sunproof improved) | 1.0 |
| Stearic acid | 1.0 |
| Polymerized petroleum hydrocarbon plasticizer (Paraflux) | 3.0 |
| | 215.0 |

The above composition, referred to as the masterbatch, was then combined with sulfur (2.0 parts) and with the accelerators of the invention (1.2 parts). Comparisons were also made with commercial accelators, using 1.75 parts of bis benzothiazole disulfide (MBTS) or N-cyclohexylbenzothiazole sulfenamide (Delac S) 1.25 parts. Portions of each stock were cured for 45 and 90 minutes at 293° F. and for 45 minutes at 350° F. In addition the stocks were subjected to the "Mooney scorch test" and the so-called "scorch time" and "cure rate" were determined. The data are given in Table I.

TABLE I

| Chemical | Scorch time (270° F.) | Cure rate (270° F.) | Cure at 293° F. | | | | | | Cure at 350° F. | | |
|---|---|---|---|---|---|---|---|---|---|---|---|
| | | | 300% modulus | | Tensile | | Percent elongation | | 300% modulus, 45' | Tensile, 45' | Percent elongation 45' |
| | | | 45' | 90' | 45' | 90' | 45' | 90' | | | |
| None (sulfur alone) | >60' | | | 150 | 140 | 260 | 1,220 | 1,180 | 650 | 2,320 | |
| Bis(benzothiazolyl) disulfide (control) | 15'30'' | 4'30'' | 1,190 | 1,280 | 3,070 | 2,640 | 600 | 560 | 1,010 | 2,620 | 700 |
| N-cyclohexyl benzothiazole sulfenamide (control) | 19'15'' | 4' | 1,150 | 1,160 | 3,060 | 2,820 | 600 | 610 | 990 | 2,580 | 660 680 |
| Zinc benzene sulfinate | 39' | >60' | 430 | 860 | 1,980 | 2,580 | 870 | 650 | 1,190 | 2,800 | 620 |
| Zinc p-toluene sulfinate | 38' | >60' | 440 | 900 | 2,030 | 2,650 | 850 | 660 | 1,200 | 2,840 | 540 |
| Zinc-p,p'-oxybis(benzene sulfinate) | >60' | | 200 | 510 | 700 | 1,970 | 1,000+ | 760 | 1,220 | 3,000 | 610 |
| Zinc p-chlorobenzene sulfinate | 47' | >60' | 310 | 700 | 1,320 | 2,320 | 900 | 690 | 1,240 | 3,130 | 650 |
| Zinc butane-1,4-disulfinate | >60' | | 200 | 550 | 790 | 2,010 | 1,000 | 730 | 870 | 2,500 | 720 |
| Zinc p-nitrobenzene sulfinate | 56' | >60' | 280 | 700 | 1,350 | 2,330 | 900 | 700 | 1,070 | 2,670 | 650 |
| p-Toluene sulfinic acid | 41' | >60' | 460 | 830 | 1,960 | 2,590 | 870 | 600 | 1,130 | 2,870 | 640 |
| Zinc-alpha-toluene sulfinate | 52' | >60' | 250 | 470 | 1,250 | 2,300 | 950 | 840 | 870 | 2,600 | 760 |
| Reaction product p-toluene sulfinic acid and formaldehyde | 34' | >60' | 480 | 930 | 2,290 | 2,930 | 820 | 680 | 1,140 | 2,900 | 680 |
| Tert.-butyl ammonium p-toluene sulfinate | 19' | 36' | 900 | 1,240 | 2,830 | 2,480 | 670 | 500 | 1,380 | 3,100 | 590 |

It can be seen from the data on Table I that the sulfinic acid compounds of the invention are highly effective cures at higher curing temperatures (350° F.). This example may be repeated, using polyisoprene, polybutadiene, etc.

the two commercial accelerators at 350° F. and are much less active than the two commercial accelerators at 243° F. The scorch safety of the sulfinic acid derivatives as measured at 270° F. is generally much greater than that of the two commercial accelerators. This example may be repeated using other diene rubbers, such as natural rubber, polybutadiene, EPDM, etc.

EXAMPLE IV

A number of metal salts of sulfinic acid were similarly studied in the recipe given in Example I. The cure data are shown in Table IV. The curing process of this and the other examples is useful in the manufacture of rubber articles of all sorts, including tires, belts, hose, footwear, etc.

EXAMPLE II

In order to evaluate the effectiveness of my sulfinate accelerators under a variety of curing conditions rubber compositions were prepared in accordance with the recipe given in Example I and containing 2.0 parts of sulfur and 1.2 parts of a number of sulfinic acid compounds as indicated in Table II. In this case, portions of the stocks were cured at 295° F., 350° F., and 400° F. The "Mooney scorch" was measured at 270° F. The physical properties of the cured vulcanizates are shown in Table II.

This example may be repeated, using the other diene rubbers, such as butyl rubber, ethylene-propylene-ethylidene norbornene terpolymer, etc.

EXAMPLE III

Data obtained in a similar study using the recipe cited for Example I and employing a number of sulfinic acid compounds are shown in Table III.

It is of particular significance that the sulfinic acids of my invention are much less active as accelerators at lower temperatures (292° F.) than the two standard accelerators (bis benzothiazyl disulfide and N-cyclohexyl ben- The examples may be repeated using blends of rubbers, e.g., blends of emulsion-polymerized SBR with solution-polymerized polybutadiene, blends of EPDM with butyl, SBR, or polybutadiene, etc.

zothiazole sulfenamide) and give highly effective cures at

TABLE II

| Chemical | Scorch time, 270° F. | Cure rate, 270° F. | Cure at 292° F. | | | | | | | Cure at 350° F. | | | | | | | Cure at 400° F. | | | | | |
|---|---|---|---|---|---|---|---|---|---|---|---|---|---|---|---|---|---|---|---|---|---|---|
| | | | 300% modulus | | Tensile | | | Elongation | | 300% modulus | | Tensile | | Elongation | | 300% modulus | | Tensile | | Elongation | |
| | | | 45' | 90' | 45' | 90' | 45' | 90' | 15' | 30' | 45' | 15' | 30' | 45' | 15' | 30' | 45' | 15' | 30' | 15' | 30' | |
| Bis benzothiazole di-sulfide (1.75) (control) | 14'30" | 3' | 1,300 | 1,410 | 3,300 | 3,350 | 600 | 550 | 1,060 | 1,120 | 3,080 | 2,920 | 640 | 600 | 950 | 960 | 2,640 | 2,410 | 610 | 530 |
| N-cyclohexyl benzothiazole sulfenamide (1.2) (control) | 16'30" | 3' | 1,260 | 1,300 | 3,350 | 2,750 | 610 | 510 | 1,000 | 1,020 | 2,720 | 2,820 | 630 | 620 | 860 | 980 | 2,110 | 2,420 | 550 | 600 |
| Ammonium p-toluene sulfinate (1.2) | 13'31" | 32' | 450 | | 1,910 | | 860 | | 1,020 | 1,120 | 2,550 | 2,610 | 550 | 540 | 1,020 | 1,130 | 2,210 | 2,290 | 530 | 530 |
| Zinc benzene sulfinate | 37'30" | >60' | 210 | 500 | 150 | 550 | 980 | 860 | 950 | 700 | 2,700 | 2,310 | 640 | 610 | 750 | 850 | 2,220 | 2,300 | 610 | 540 |
| Calcium benzene sulfinate | >60 | | 30 | 220 | 150 | 610 | 1,000+ | 900 | 660 | 660 | 2,260 | 2,310 | 710 | 670 | 730 | 750 | 2,220 | 2,310 | 680 | 540 |
| Barium benzene sulfinate | >60 | | 30 | 210 | 150 | 530 | 1,000+ | 880 | 590 | 600 | 1,920 | 2,190 | 700 | 640 | 850 | 910 | 2,440 | 2,150 | 670 | 630 |
| Magnesium benzene sulfinate | >60 | | 130 | 280 | 230 | 980 | 840 | 850 | 800 | 670 | 2,260 | 2,410 | 730 | 610 | 950 | 1,000 | 2,350 | 2,500 | 640 | 620 |
| Lead benzene sulfinate | 40' | >60' | 190 | 350 | 350 | 1,290 | 1,000+ | 830 | 800 | 820 | 2,220 | 2,380 | 650 | 620 | 950 | 990 | 2,040 | 2,350 | 600 | 520 |
| Calcium p-toluene sulfinate | 51' | >60' | 180 | 330 | 300 | 1,410 | 1,000+ | 850 | 790 | 820 | 2,460 | 2,400 | 660 | 630 | 800 | 880 | 2,200 | 2,100 | 530 | 580 |
| Barium p-toluene sulfinate | 53' | >60' | 170 | 160 | 300 | 270 | 1,000+ | 860 | 650 | 740 | 2,260 | 2,280 | 690 | 660 | 890 | 880 | 2,360 | 2,350 | 620 | 580 |
| Magnesium p-toluene sulfinate | 58' | >60' | 140 | 300 | 270 | 1,100 | 1,000+ | 860 | 600 | 720 | 2,200 | 2,200 | 700 | 630 | 800 | 950 | 2,040 | 2,200 | 600 | 600 |
| Lead p-toluene sulfinate | 27' | >60' | 220 | 400 | 480 | 1,600 | 920 | 820 | 900 | 960 | 2,400 | 2,280 | 600 | 560 | 890 | 880 | 2,270 | 2,130 | 620 | 580 |
| Sodium p-toluene sulfinate | 30' | >60' | 200 | 500 | 650 | 2,080 | 880 | 780 | 850 | 900 | 2,370 | 2,450 | 700 | 570 | 970 | 1,040 | 2,280 | 2,150 | 540 | 470 |
| Zinc 2-benzothiazole sulfinate | 57' | >60' | 190 | 310 | 300 | 1,100 | 1,000+ | 920 | 840 | 900 | 2,210 | 2,410 | 600 | 670 | 1,000 | 1,110 | 2,450 | 2,100 | 720 | 670 |
| p-Tolyl hydroxymethyl sulfone | 23' | >60' | 230 | 660 | 1,070 | 2,070 | 990 | 740 | 900 | 700 | 2,780 | 2,760 | 700 | 630 | 700 | 710 | 2,260 | 2,480 | 620 | 540 |
| t-Octylammonium-p-toluene sulfinate | 35' | >60' | 310 | 700 | 1,300 | 2,600 | 1,000+ | 860 | 1,020 | 990 | 2,650 | 1,900 | 650 | 680 | 950 | 1,200 | 2,350 | 2,470 | 580 | 570 |
| n-Dodecylammonium-p-toluene sulfinate | 21' | 37' | 210 | 400 | 590 | 1,680 | 890 | 800 | 600 | 520 | 2,200 | 2,200 | 700 | 540 | 850 | 1,300 | 2,240 | 2,400 | 640 | 640 |
| Cyclohexylammonium-p-toluene sulfinate | 14' | 21'45" | 380 | 790 | 1,630 | 2,580 | 900 | 380 | 860 | 1,100 | 2,140 | 2,260 | 550 | 620 | 980 | 1,000 | 2,350 | 2,350 | 570 | 540 |
| Isopropylammonium-p-toluene sulfinate | 44' | >60' | 590 | 1,090 | 2,450 | 2,810 | 1,000+ | 580 | 700 | | 2,560 | 2,590 | 650 | 620 | 1,050 | 1,090 | 2,470 | 2,300 | 560 | 550 |
| Triethylammonium-p-toluene sulfinate | 21' | | 250 | 600 | 830 | 2,350 | 750 | 780 | 1,020 | 1,100 | 2,650 | 2,320 | 690 | 710 | 1,000 | 1,120 | 2,360 | 2,350 | 590 | 560 |
| p-Acetamino benzene sulfinic acid | >60 | | 170 | 310 | 250 | 1,110 | 960 | 880 | 800 | 840 | 2,370 | 2,110 | 650 | 660 | 980 | 1,010 | 2,190 | 2,110 | 580 | 560 |
| Zinc p-acetamino benzene sulfinate | 15' | 28' | 10 | 190 | 110 | 500 | 1,000+ | 950 | 540 | 520 | 2,080 | 2,960 | 760 | 710 | 700 | 750 | 2,540 | 2,350 | 600 | 630 |
| Dibutylammonium-p-toluene sulfinate | 17'45" | 35'15" | 480 | 980 | 2,280 | 3,150 | 830 | 650 | 980 | 1,060 | 2,920 | 2,980 | 660 | 620 | 950 | 1,100 | 2,300 | 2,330 | 600 | 550 |
| t-Butylammonium-p-toluene sulfinate | 16'15" | 26'45" | 410 | 900 | 1,980 | 2,700 | 820 | 640 | 1,050 | 1,060 | 2,610 | 2,610 | 550 | 560 | 1,100 | 1,180 | 2,300 | 2,170 | 530 | 443 |
| n-Butylammonium-p-toluene sulfinate | | | 420 | 810 | 2,100 | 2,860 | 900 | 920 | 810 | 990 | 2,700 | 2,600 | 670 | 590 | 960 | 960 | 2,330 | 2,260 | 580 | 560 |

TABLE III

| Chemical | Scorch time | Cure rate | Cure at 292° F. | | | | | | Cure at 350° F. | | | | | |
|---|---|---|---|---|---|---|---|---|---|---|---|---|---|---|
| | | | 300% modulus | | Tensile | | Elongation | | 300% modulus | | Tensile | | Elongation | |
| | | | 45' | 90' | 45' | 90' | 45' | 90' | 30' | 45' | 30' | 45' | 30' | 45' |
| Blank (sulfur alone) | >60' | | | 150 | 140 | 260 | 1,220 | 1,180 | 590 | 650 | 1,980 | 2,320 | 740 | 700 |
| Bis(benzothiazyl)disulfide (control) | 13'30" | 3'15" | 1,150 | 1,270 | 3,300 | 3,340 | 620 | 670 | 1,010 | 1,040 | 3,000 | 3,130 | 630 | 650 |
| N-cyclohexylbenzothiazole sulfenamide (control) | 15' | 3'30" | 1,190 | 1,250 | 3,510 | 3,260 | 670 | 610 | 970 | 950 | 3,130 | 3,110 | 710 | 690 |
| Zinc(mixed toluene) sulfinates | 29' | >60' | 210 | 330 | 780 | 1,500 | 920 | 930 | 920 | 1,010 | 2,630 | 2,810 | 640 | 620 |
| Zinc-2,5-dimethyl benzene sulfinate | 48' | >60' | 140 | 200 | 280 | 650 | 1,070 | 980 | 690 | 800 | 2,230 | 2,530 | 660 | 660 |
| Cyclohexylammonium-2,5-dimethyl benzene sulfinate | 27' | >60' | 210 | 350 | 870 | 1,540 | 830 | 750 | 790 | 840 | 1,910 | 1,980 | 540 | 520 |
| Zinc-2-naphthalene sulfinate | 46' | >60' | 130 | 200 | 370 | 700 | 1,180 | 1,010 | 600 | 710 | 2,110 | 2,320 | 730 | 660 |
| Cyclohexylammonium 2-naphthalenesulfinate | 25' | >60' | 250 | 440 | 1,100 | 1,810 | 860 | 750 | 800 | 860 | 2,420 | 2,560 | 610 | 600 |
| Dicyclohexylammonium p-toluene sulfinate | 17'26" | 30' | 360 | 600 | 1,340 | 1,470 | 710 | 530 | 850 | 960 | 1,820 | 1,820 | 510 | 450 |
| Methylammonium-p-toluene sulfinate | 45' | >60' | 220 | 400 | 150 | 1,860 | 950 | 810 | 780 | 820 | 2,520 | 2,610 | 680 | 660 |
| Reaction product of p-toluene sulfinic acid and ethanolamine | 23' | 44' | 380 | 720 | 1,610 | 2,440 | 820 | 680 | 720 | 820 | 2,710 | 2,550 | 710 | 620 |
| Reaction product of p-toluene sulfinic acid and ethylenediamine (2:1) | 14' | 22'15" | 590 | 990 | 2,400 | 2,900 | 770 | 650 | 1,130 | 1,160 | 3,210 | 3,050 | 610 | 590 |
| Diethylamino p-toluene sulfinate | 18'30" | 31'30" | 420 | 900 | 2,010 | 3,000 | 890 | 690 | 1,000 | 970 | 2,870 | 2,750 | 610 | 610 |
| Mono-n-butylammonium p-toluene sulfinate | 18'30" | 32'30" | 350 | 750 | 1,690 | 2,720 | 880 | 730 | 880 | 920 | 2,830 | 2,690 | 600 | 550 |
| Reaction product of p-toluene sulfinic acid and 3-dimethylamino propylamine | 12'30" | 22'15" | 600 | 1,000 | 2,660 | 3,150 | 780 | 640 | 870 | 1,060 | 2,890 | 2,600 | 620 | 540 |
| Reaction product of p-toluene sulfinic acid and 3-diethylamino propylamine | 15'30" | 26' | 540 | 900 | 2,060 | 2,450 | 750 | 590 | 970 | 1,070 | 2,830 | 2,640 | 620 | 560 |
| Di-n-propylammonium p-toluene sulfinate | 19' | 32'45" | 400 | 870 | 1,900 | 2,590 | 860 | 620 | 970 | 1,010 | 2,750 | 2,880 | 630 | 640 |
| Bis(p-toluene sulfonyl methyl) amine | 22' | 35' | 510 | 760 | 2,330 | 2,810 | 880 | 720 | 1,030 | 1,060 | 2,830 | 2,690 | 620 | 540 |

TABLE IV

| Chemical (1.2 parts each) | Cure at 292° F. | | | | | | Cure at 350° F. | | | | | | Cure at 400° F. | | | | | |
|---|---|---|---|---|---|---|---|---|---|---|---|---|---|---|---|---|---|---|
| | 300% modulus | | Tensile | | Elongation | | 300% modulus | | Tensile | | Elongation | | 300% modulus | | Tensile | | Elongation | |
| | 45' | 90' | 45' | 90' | 45' | 90' | 30' | 45' | 30' | 45' | 30' | 45' | 15' | 30' | 15' | 30' | 15' | 30' |
| N-cyclohexyl benzothiazole sulfenamide (control) | 1,150 | 1,220 | 3,200 | 3,360 | 630 | 610 | 970 | 1,020 | 3,190 | 3,100 | 560 | 640 | 750 | 810 | 2,690 | 2,590 | 710 | 670 |
| Cadmium benzene sulfinate | 250 | 420 | 450 | 1,660 | 960 | 970 | 840 | 950 | 2,660 | 2,690 | 650 | 620 | 900 | 930 | 2,610 | 2,520 | 660 | 610 |
| Stannous benzene sulfinate | | 300 | 220 | 960 | 1,050 | 910 | 800 | 860 | 1,840 | 2,260 | 530 | 560 | 760 | 910 | 1,900 | 2,100 | 560 | 560 |
| Nickelous benzene sulfinate | 200 | 380 | 260 | 1,190 | 1,070 | 890 | 920 | 980 | 2,630 | 2,910 | 640 | 650 | 920 | 1,080 | 2,540 | 2,410 | 630 | 550 |
| Cupric p-toluene sulfinate | 200 | 250 | 240 | 670 | 900 | 740 | 710 | 740 | 2,060 | 2,090 | 640 | 590 | 790 | 850 | 2,250 | 2,250 | 640 | 600 |
| Nickelous p-toluene sulfinate | 210 | 560 | 420 | 1,950 | 1,010 | 820 | 980 | 1,100 | 2,850 | 2,700 | 620 | 560 | 1,010 | 1,120 | 2,650 | 2,340 | 600 | 550 |

Having thus described my invention, what I claim and desire to protect by Letters Patent is:

1. In a method of accelerating the sulfur vulcanization of a sulfur-vulcanizable unsaturated rubber, the improvement comprising using as the accelerator a chemical selected from the group consisting of those of the formulas:

I.

II.
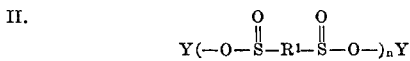

III.
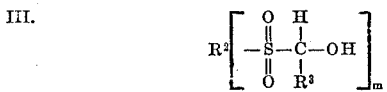

and

IV.
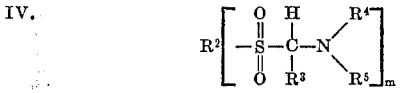

wherein R is a monovalent organic radical selected from aryl, alkyl, cycloalkyl, and 2-benzothiazyl radicals, $n$ is a number equal to the valence of Y, Y is selected from
   (a) hydrogen
   (b) metal and
   (c) the radical:

where $R^6$, $R^7$ and $R^8$ are the same or different and are selected from hydrogen, alkyl, cycloalkyl, piperidyl and morpholyl, $R^1$ is a divalent organic radical selected from alkylene and arylene, $R^2$ is selected from
   (i) R as previously defined and
   (ii) $R^1$ as previously defined $m$ is a number equal to the valence of $R^2$, $R^3$ is selected from hydrogen, alkyl, and aryl, and $R^4$ and $R^5$ are the same or different and have values as defined above for $R^6$, $R^7$ and $R^8$.

2. In an accelerated sulfur-vulcanizable rubber composition, the improvement comprising an accelerator selected from the group consisting of those of the formulas:

I.

II.
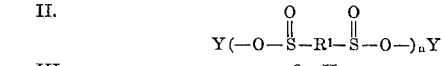

III.

and

IV.
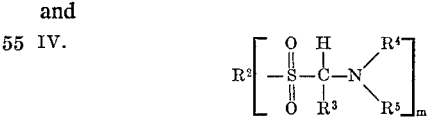

wherein R is a monovalent organic radical selected from aryl, alkyl, cycloalkyl, and 2-benzothiazyl radicals, $n$ is a number equal to the valence of Y, Y is selected from
   (a) hydrogen
   (b) metal and
   (c) the radical:

where $R^6$, $R^7$ and $R^8$ are the same or different and are selected from hydrogen, alkyl, cycloalkyl, piperidyl and morpholyl, $R^1$ is a divalent organic radical selected from alkylene and arylene, $R^2$ is selected from
   (i) R as previously defined and
   (ii) $R^1$ as previously defined $m$ is a number equal to the valence of $R^2$, $R^3$ is selected from hydrogen, alkyl, and aryl, and $R^4$ and $R^5$ are the same or different and have values as defined above for $R^6$, $R^7$ and $R^8$.

3. A method as in claim 1 in which the accelerator of the said formula is a sulfinic acid.

4. A method as in claim 1 in which the accelerator of the said formula is a metal salt of a sulfinic acid.

5. A method as in claim 1 in which the accelerator of the said formula is an amine or ammonium salt of a sulfinic acid.

6. A method as in claim 1 in which the accelerator of the said formula is an alpha-hydroxy sulfone.

7. A method as in claim 1 in which the accelerator has the Formula IV.

8. A method as in claim 1 in which the rubber is selected from the group consisting of polybutadiene, polyisoprene, and butadiene-styrene copolymer.

9. A method as in claim 1 in which the rubber is butadiene-styrene copolymer.

10. A method as in claim 1 in which the accelerator is zinc benzene sulfinate.

11. A method as in claim 1 in which the accelerator is zinc p-tolueune sulfinate.

12. A method as in claim 1 in which the accelerator is tert. butyl ammonium p-toluene sulfinate.

13. A method as in claim 1 in which the accelerator is zinc-p-chlorobenzene sulfinate.

14. A method as in claim 1 in which the accelerator is zinc-p,p'-oxybis(benzene sulfinate).

15. A method as in claim 1 in which the accelerator is p-tolyl hydroxymethyl sulfone.

References Cited

UNITED STATES PATENTS 2,750,357    6/1965    Bredereck et al. _____ 260—77.5

FOREIGN PATENTS 900,172    7/1962    Great Britain.

JOSEPH L. SCHOFER, Primary Examiner

C. A. HENDERSON, Jr., Assistant Examiner

U.S. Cl. X.R.

260—247, 293, 306, 429, 429.7, 435, 438.1, 439, 513.7, 583, 783, 784, 792

UNITED STATES PATENT OFFICE
CERTIFICATE OF CORRECTION

Patent No. 3,518,236      Dated June 30, 1970

Inventor(s) Byron A. Hunter

It is certified that error appears in the above-identified patent and that said Letters Patent are hereby corrected as shown below:

Col. 10, lines 50-52, formula III should read:

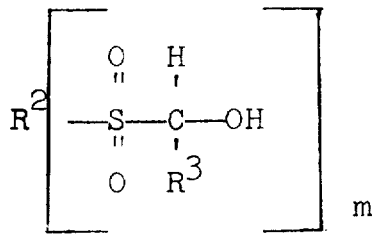

Col. 11, line 24, "tolueune" should read --toluene--.

SIGNED AND SEALED
NOV 10 1970

(SEAL)
Attest:

Edward M. Fletcher, Jr.
Attesting Officer

WILLIAM E. SCHUYLER, JR.
Commissioner of Patents